United States Patent
Lemble

(10) Patent No.: US 10,434,698 B2
(45) Date of Patent: Oct. 8, 2019

(54) METHOD FOR BLOW-MOLDING CONTAINERS, AND MACHINE FOR SAID METHOD

(71) Applicant: SIDEL PARTICIPATIONS, Octeville-sur-Mer (FR)

(72) Inventor: Thierry Lemble, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 407 days.

(21) Appl. No.: 14/424,645

(22) PCT Filed: Oct. 23, 2013

(86) PCT No.: PCT/FR2013/052537
§ 371 (c)(1),
(2) Date: Feb. 27, 2015

(87) PCT Pub. No.: WO2014/068223
PCT Pub. Date: May 8, 2014

(65) Prior Publication Data
US 2015/0209997 A1   Jul. 30, 2015

(30) Foreign Application Priority Data
Oct. 29, 2012  (FR) .................................... 12 60281

(51) Int. Cl.
*B29C 49/18*  (2006.01)
*B29C 49/78*  (2006.01)
(Continued)

(52) U.S. Cl.
CPC ............ *B29C 49/18* (2013.01); *B29C 49/783* (2013.01); *B29C 49/786* (2013.01); *B29D 22/003* (2013.01); *B29L 2031/7158* (2013.01)

(58) Field of Classification Search
CPC .. B29C 49/78; B29C 2949/78806; G05B 5/00
(Continued)

(56) References Cited

U.S. PATENT DOCUMENTS

X9380 I1 * 2/1836 Peckham ..................... 251/147
3,346,726 A * 10/1967 Rouxel ................. G05B 13/02
                                                       318/561
(Continued)

FOREIGN PATENT DOCUMENTS

EP   1 777 056 A1   4/2007
EP   1 905 569 A2   4/2008
(Continued)

OTHER PUBLICATIONS

"Chapter 10 PID Control" California Institute of Technology. Aug. 2006. Web. Accessed Apr. 24, 2017. https://web.archive.org/web/20100723061144/http://www.cds.caltech.edu/~murray/books/AM08/pdf/am06-pid_16Sep06.pdf.*
(Continued)

*Primary Examiner* — Robert C Dye
*Assistant Examiner* — Russell E Sparks

(57) ABSTRACT

A method and machine for blow-moulding containers, the method involves selecting at least one characteristic point of the pressure in the container; for each selected point, defining a triggering criterion, and a pre-defined value thereof; during a production and data acquisition cycle, measuring the pressure in the container; for each selected point, defining a setpoint time for triggering, in the subsequent production cycle, the switch to the sub-phase after the characteristic point, such that: if the actual value of the criterion is ≤ to the pre-defined value, the setpoint time is the time at which the criterion has assumed a value equal to the predefined value, and if the actual value of the criterion is strictly higher than the pre-defined value, the setpoint time is after the actual
(Continued)

time and is defined such that, at that time, the criterion assumes a value close to or coinciding with the pre-defined value.

15 Claims, 5 Drawing Sheets

(51) Int. Cl.
*B29D 22/00* (2006.01)
*B29L 31/00* (2006.01)

(58) Field of Classification Search
USPC .......................................................... 264/529
See application file for complete search history.

(56) References Cited

U.S. PATENT DOCUMENTS

| | | | | |
|---|---|---|---|---|
| 3,643,076 A * | 2/1972 | Bell | ................ | G05B 15/02 377/2 |
| 5,058,043 A * | 10/1991 | Skeirik | ................ | B01J 19/004 700/167 |
| 5,394,322 A * | 2/1995 | Hansen | ................ | G05B 13/045 700/32 |
| 8,658,080 B2 * | 2/2014 | Brunner | ................ | B29C 49/783 264/40.3 |
| 9,044,889 B2 * | 6/2015 | Monin | ................ | B29C 49/58 |
| 2010/0176528 A1 * | 7/2010 | Monin | ................ | B29C 49/58 264/40.5 |
| 2010/0237528 A1 * | 9/2010 | Derrien | ................ | B29C 49/46 264/84 |
| 2011/0057343 A1 * | 3/2011 | Brunner | ................ | B29C 49/783 264/40.1 |
| 2011/0175246 A1 * | 7/2011 | Winzinger | ................ | B29C 49/78 264/40.1 |

FOREIGN PATENT DOCUMENTS

| | | |
|---|---|---|
| EP | 1 922 206 A1 | 1/2009 |
| EP | 2 014 443 A1 | 1/2009 |

OTHER PUBLICATIONS

Smuts, Jacques. Ziegler-Nichols Open-Loop Tuning Rules. Control Notes, May 18, 2011. Web. Accessed Apr. 25, 2017. http://blog.opticontrols.com/archives/477.*
International Search Report, dated Dec. 10, 2013, from corresponding PCT application.

* cited by examiner

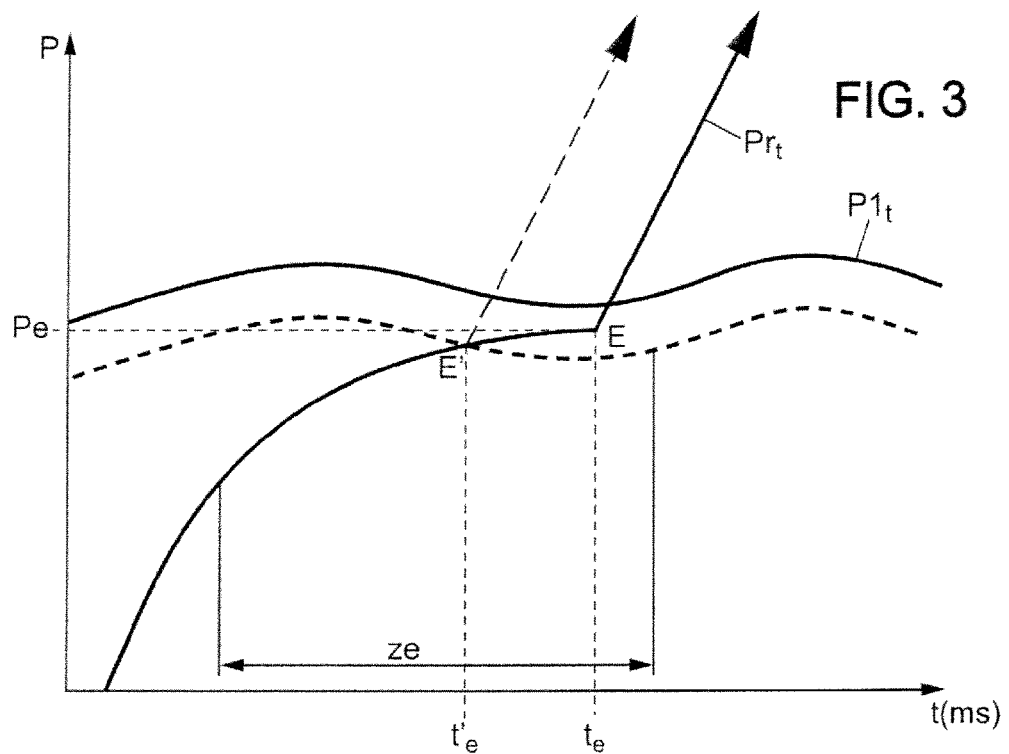
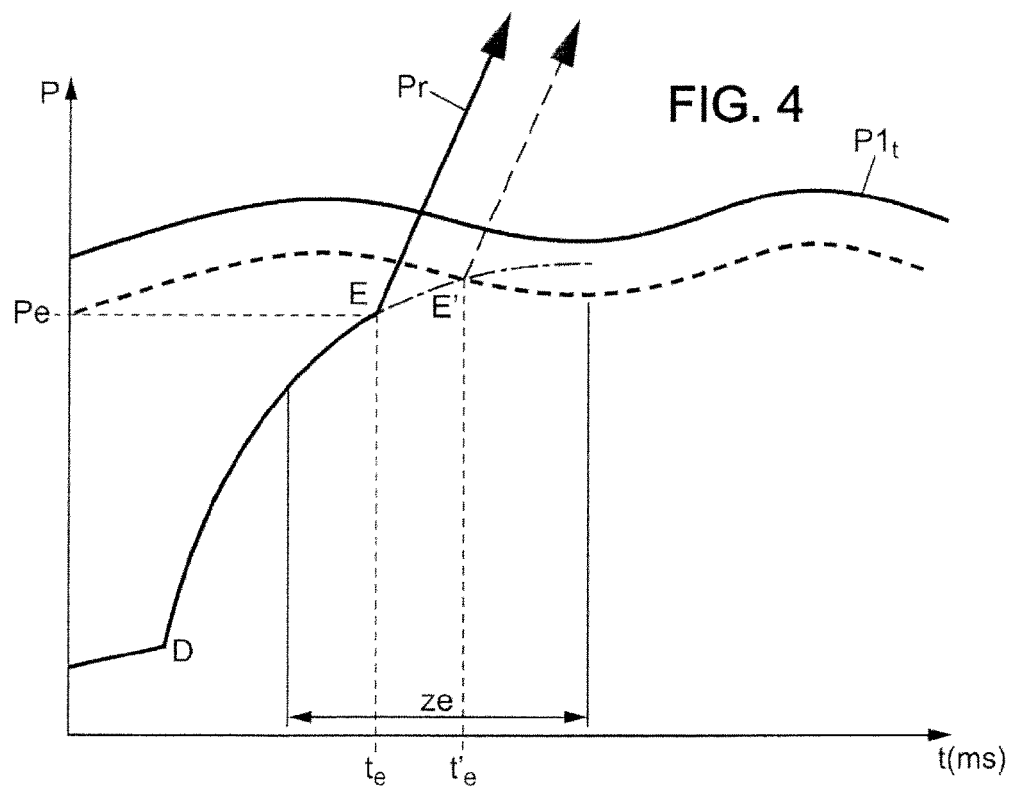

METHOD FOR BLOW-MOLDING CONTAINERS, AND MACHINE FOR SAID METHOD

FIELD OF THE INVENTION

The invention relates to the field of methods for producing containers by blow molding or stretch-blow molding.

In the course of such methods, a preform or an intermediate container of synthetic material such as PET (polyethylene terephthalate) is brought to a temperature above the glass transition temperature of the material, then inserted into a molding unit. Air under high pressure—on the order of 40 bar—is introduced into the preform or the intermediate container whose wall expands until it is flattened against the mold to be formed. Then, the pressure in the container is lowered to open the molding unit and to remove the container at atmospheric pressure.

The invention relates in particular to the methods where the rise in pressure takes place incrementally by connecting the container during production first to a first air system having an intermediate pressure, then to a second air system having a higher pressure, and so on. This makes it possible to use intermediate-pressure air sources that are less expensive rather than to resort exclusively to a maximum-pressure air source. Also, the lowering of pressure can take place incrementally. This makes it possible for the air of the container that is compressed at high pressure to empty into the intermediate-pressure system and makes it possible to recover a portion of the energy.

The drawback of the incremental pressure methods is that the rise and fall of pressure in the container are slower. For the same molding rate of speed, this reduces the flattening time at high pressure of the container against the walls of the mold. This makes it more difficult to obtain small shape details in the container.

Consequently, to reduce this negative impact, it is necessary to optimize the adjustments of the sequencing of the method and of each of its increments, which especially complicates the task of the production operator relative to a standard method.

Furthermore, during production, or at the time of a changing of the type of product, the physical balances can change as a function of parameters of the environment, or of parameters linked to the preform, or to the bottle, which involves readjustments of the method to remain optimal.

STATE OF THE ART

The technician is today required to watch a pressure curve of an article being formed, its different successive stages of rise in pressure, its different successive stages of depressurization, and to come up with an interpretation that allows him to shorten or lengthen the time of each of the phases without compromising industrial efficiency. He must also check on the other molding units of the machine to see that his intervention is compatible with the possible dispersions.

OBJECT AND GENERAL DESCRIPTION OF THE INVENTION

The object of the invention is in particular to eliminate these drawbacks by proposing a method that makes it possible to improve the quality of the containers produced, all while maintaining—indeed while increasing—the rates of speed of production and optimizing the savings of energy.

According to one embodiment, the method of producing thermoplastic containers by stretch-blow molding consists in a known way of a series of production cycles during each of which a new container is produced, each production cycle comprising a pre-blow-molding phase where a preform is connected to a pre-blow-molding air system (S0) so that the preform becomes a container ready to be blow molded during an overall blow-molding phase which comprises successively at least the following sub-phases:

a blow molding or a series of blow moldings where the container is connected successively to increasingly higher-pressure air systems (S1, S2), then a recovery or a series of recoveries where the container is connected successively to increasingly lower-pressure recovery air systems (R1), until the last recovery where the container is connected to an air system (R2), then a degassing where the container is connected to atmospheric pressure, and finally, the opening of the mold that includes the disconnecting of the nozzle.

According to the invention, at least one point is selected that is characteristic of the pressure (Prt) in the container, i.e., a point on the curve of the pressures measured in the container. Said characteristic point is taken from among the selectable points that are, if there are several blow moldings, the transition (E) between two successive blow moldings, and if there are several recoveries, the transition (G) between two successive recoveries and the transition (H) between the last recovery and the degassing;

for each point selected, a triggering criterion ($|\Delta P|$, $|P'|$), and a predetermined value of the criterion are determined, during a production and data acquisition cycle, the pressure (Prt) in the container is measured, for each point selected, there are determined from the pressure curves measured:

the actual instant (te, tg, th) corresponding to said selected point (E, G, H), the actual value of the criterion at the selected point, and a target instant to trigger, in a subsequent production cycle, the passage to the sub-phase that is subsequent to the characteristic point, such that:

if the actual value of the criterion is less than or equal to the predetermined value, the target instant is the instant for which the criterion has assumed a value equal to the predetermined value, and if the actual value of the criterion is strictly greater than the predetermined value, the target instant is subsequent to the actual instant and is determined so as to ensure that at this instant, the criterion assumes a value approaching or coinciding with the predetermined value.

In a variant, for at least one selected characteristic point, the triggering criterion is the absolute value of the pressure difference between the container and the air system to which the container is connected during the sub-phase immediately before the characteristic point; the method comprises a step for measuring, during the production and data acquisition cycle, the pressure in the air system to which the container is connected before the selected characteristic point.

In another variant, for at least one selected characteristic point, the triggering criterion is the absolute value of the slope of the pressure in the container.

In still another variant, a time increment is determined that is adapted to the selected characteristic point and to the determined criterion and in which, if the actual value of the criterion at the selected characteristic point is greater than the predetermined value, the target instant for the following cycle is equal to the actual instant for the cycle that has just been measured, increased by the increment.

In a variant, if the actual value of the criterion at the selected characteristic point is greater than the predetermined value, the criterion is simulated subsequent to the actual instant and in which the target instant for the following cycle is equal to the instant for which the simulated criterion assumes a value equal to the predetermined value.

According to a particular embodiment, a predetermined final degassing pressure threshold is determined, and there is also determined, from the curves of pressures measured, an actual instant ($t_f$) of the end of blow molding (F) and the pressure in the container just before the opening of the mold, and in which a target instant ($t'_f$) of the end of blow molding for a subsequent production cycle is determined, which target instant ($t'_f$) is prior to, equal to, or subsequent to the actual instant ($t_f$) of the end of blow molding depending on whether the pressure in the container just before the opening of the mold is respectively greater than, equal to, or less than the final degassing pressure threshold.

Advantageously, if the mean pressure in the container over a predetermined period of time before the opening of the mold is less than the final degassing pressure threshold, a target instant ($t_k$) of the end of degassing is determined for which the pressure measured in the container is equal to the predetermined threshold, and in which the target instant ($t'_f$) of the end of blow molding (F') for the subsequent production cycle is subsequent to the actual instant ($t_f$) of the end of blow molding for a period of time equal to the period of time that passes from the target instant ($t_k$) of degassing to the instant ($t_L$) of the actual opening of the mold.

Advantageously, if the mean pressure in the container over a predetermined period of time before the opening of the mold is greater than the degassing pressure threshold, the target instant ($t'_f$) of the end of blow molding for a subsequent production cycle is determined, either by going back a predetermined period of time to the actual instant ($t_f$) of the end of blow molding, or by simulating the pressure in the container as if there had not been any opening of the mold, by determining an end of the degassing target instant for which the simulated pressure is equal to the degassing pressure threshold; the target instant of the end of blow molding is then prior to the actual instant of the end of blow molding for a period of time equal to the period of time that passes from the instant of the actual opening of the mold to the target instant of degassing.

Advantageously, an initial position of the beginning of the first recovery is determined, and a single blow molding is used from the highest-pressure air system (S2), then, when the mean pressure in the recovery system (R1) reaches a predetermined threshold, an initial transition position between the next-to-last blow molding and the last blow molding is determined, then, the points (E, G) of the beginning of the last blow molding and of the end of the first recovery are selected, and these two points are optimized in a subsequent production cycle in the above-mentioned manner, then, the point (H) of the last recovery is selected that is optimized as well in a still later production cycle, then, an instant of the end of the last blow molding is determined.

Advantageously, after the optimization of the pair of points of the beginning of the last blow molding and of the end of the first recovery and before the optimization of the point of the beginning of the last recovery, the possible pairs of intermediate points of intermediate blow molding and of corresponding recovery are optimized.

Advantageously, the method uses a carousel equipped with a plurality of stretch-blow-molding stations, each connected to the different air systems (S0, S1, S2, R1, R2), a portion or all of said stations being reference stations. For each container of the reference stations and for each point selected, the pressure ($Pr^i_t$) in the container of each of the reference stations is measured, and a corresponding target instant is determined. For each point selected, the distribution of said target instants is analyzed, and either an alert message, or a stability message, or a mean target instant for the point selected is determined. If a mean target instant is determined, said mean target instant is applied in all of the stretch-blow-molding stations, starting from a subsequent production cycle.

Advantageously, to go from a sub-phase of the overall blow-molding phase that precedes a characteristic point (E, F, G, H) of pressure (Prt) to a sub-phase following said characteristic point:

the closing of a connecting valve corresponding to the sub-phase that precedes said characteristic point is controlled, and the opening of the connecting valve corresponding to the sub-phase that follows the characteristic point is controlled.

Advantageously, the time targets for actuating the connecting valves of the container are determined by taking into account the response time of said valves to ensure that the actual closing of the valve to be closed is prior to or coincides with the instant (te) of the actual opening of the valve to be opened.

Advantageously, to determine a characteristic point (E, F, G, H) of the pressure (Prt) in the container as a function of time:

a digital filter is applied to the curve of pressure (Prt) in the container, a scanning time zone (ze, zf, zg, zh) of the curve is determined where the characteristic point to be determined can be found, an angular point of the curve in the scanning zone is detected.

According to a particular embodiment, the following are pre-determined: a degassing pressure threshold, an actual instant ($t_a$) of the beginning of pre-blow molding (A), an actual instant ($t_L$) of the opening of the mold, and a target instant ($t_k$) of the end of degassing, such that the actual or simulated pressure—as if there had not been any opening of the mold—is equal to the final degassing pressure threshold, and in which a rate of speed target is determined for the subsequent production cycle that is equal to the rate of speed of the cycle that has just been measured, multiplied by the period of time between the instant ($t_a$) of the beginning of pre-blow molding and the instant ($t_L$) of the opening of the mold, divided by the period of time between the instant ($t_a$) of the beginning of pre-blow molding and the target instant ($t_k$) of the end of degassing.

BRIEF DESCRIPTION OF THE DRAWINGS

This invention will be better understood by studying the detailed description of several embodiments taken by way of examples that are in no way limiting and that are illustrated by the accompanying drawings in which:

FIG. 3 illustrates a first embodiment of the method,
FIG. 4 illustrates a second embodiment of the method.

DETAILED DESCRIPTION

Figure 1:
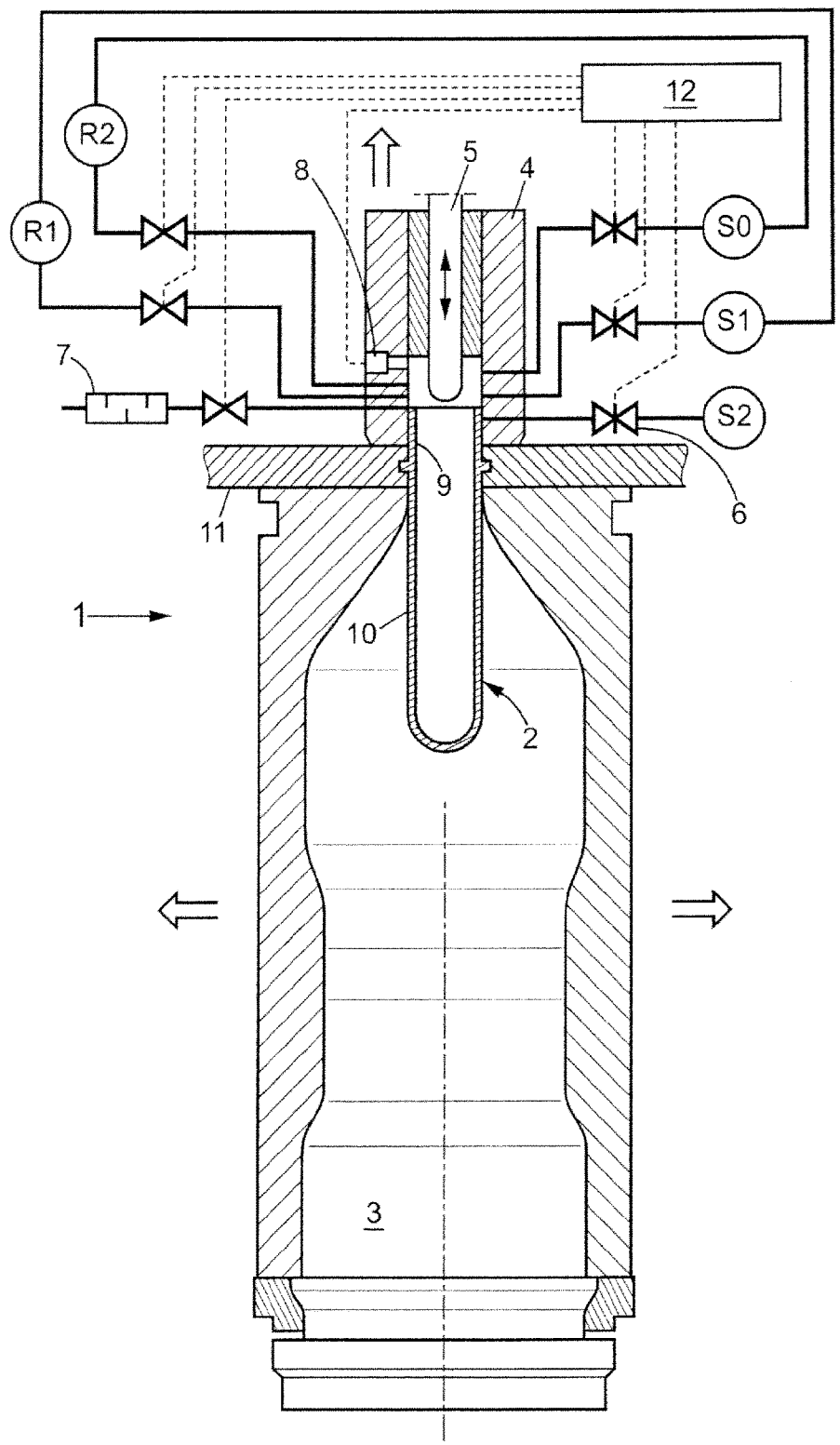
FIG. 1 is a diagram illustrating a molding installation for container production according to the method.

As illustrated in FIG. 1, a molding unit 1 for stretch-blow molding of a thermoplastic preform 2 comprises a mold forming a molding cavity 3 in two parts that can be separated to free the container produced. The molding unit 1 further comprises a blow-molding nozzle 4 equipped with a vertically mobile lengthening rod 5. The blow-molding nozzle 4 is connected by valves 6 to a pre-blow-molding air system S0, an intermediate-pressure blow-molding system S1, a maximum-pressure blow-molding air system S2, an intermediate recovery system R1, and a last recovery system R2. The blow-molding nozzle 4 is also connected to the atmospheric pressure by means of a muffler 7 and comprises a pressure sensor 8.

The preform 2 comprises a neck 9 and a body 10 which is preheated before being introduced into the cavity 3 by a holding means 11. During the stretch-blow molding, the cavity 3 is closed around the body 10, the blow-molding nozzle 4 engages on the neck 9, and the sensor 8 can then measure the pressure in the body 10.

Figure 2:
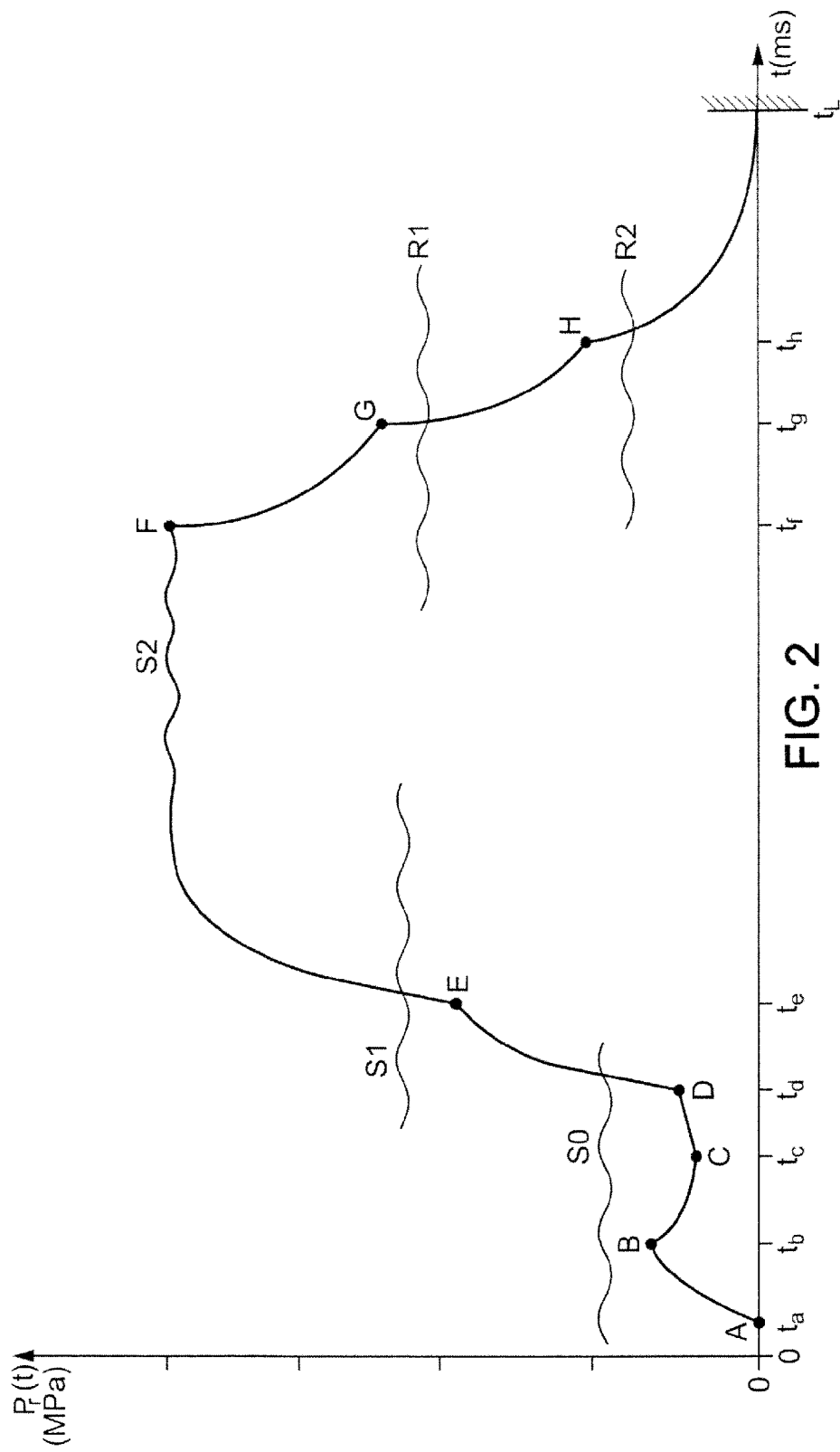
FIG. 2 is a plot of air pressure in the container.

At the instant $t_a$ indicated in FIG. 2, the valve of the pre-blow-molding system S0 is open. The preheated body 9 begins to expand, and the pressure Pr(t) in the body 10 increases as if the pressure in the container were going to balance with the pressure of the system S0. At an instant $t_b$, the lengthening rod 5 descends into the body 10 to stretch it axially. That narrows the wall of the body 10 and rapidly increases the interior volume of the body 10. The air pressure then falls temporarily until the body has the length of the cavity 3, as indicated by the point C of FIG. 2. Then, the air of the system S0 continues to flow into the body 10, and the pressure rises again.

Then comes the overall blow-molding phase which makes it possible to transform the preform 2 into a container. This blow-molding phase comprises the following sub-phases:
the valve of the pre-blow-molding system S0 is closed at the instant $t_d$, and the valve of the first blow-molding system S1 is open. The valves are controlled by a control unit 12. The air of the system S1 flows into the container by means of the blow-molding nozzle 4, and the pressure Pr(t) in the container increases as if it were going to be balanced with the approximately stable pressure of the intermediate blow-molding system S1.
At the instant $t_e$, before the pressure Pr(t) of the container has reached that of the system S1, the valve of the system S1 is closed and the valve of the maximum blow-molding system S2 is open. The pressure of the maximum blow-molding system can be about 40 bar. The flow of air into the container then occurs faster, and the triggering of the maximum blow molding is reflected by an inflection point at E on the curve Pr(t).
The flow of air of the system S2 continues until the pressure Pr(t) in the container balances with the pressure in the system S2. Under this pressure, the body continues to expand until being flattened against the wall of the cavity 3. The maintaining of the maximum pressure makes it possible for the container thus manufactured to conform to all of the shape details imposed by the cavity 3. Although the container is finished at the point F, the mold cannot be directly opened to recover the container because the air there is still at 40 bar. The pressure in the container must be lowered before opening the mold.
At the instant $t_f$, the control unit 12 closes the valve of the system S2 and opens that of the first recovery system R1. The air then flows from the container to the system R1, and the pressure curve Pr(t) has the characteristic behavior of a flow of air between two receptacles of different pressures for the purpose of balancing their pressures. This intermediate flow makes it possible to recover a portion of the compressed energy contained in the volume of air at 40 bar of the container. The air of the system R1 can, after filtering, supply the intermediate blow-molding system S1.
At the instant $t_g$, the control unit 12 closes the valve of the system R1 and opens that of the system R2. The triggering of this second recovery takes place before the pressure in the container has reached the pressure of the system R1. This makes it possible to speed up the lowering of the pressure Pr(t) in the container. After filtering, the air recovered in the system R2 can supply the pre-blow-molding system S0.
Similarly, at the instant $t_h$, the R2 valve is closed and that of the muffler 7 is opened.
Finally, at the instant $t_L$, determined by the rate of speed of the stretch-blow-molding machine, the mold is opened. This is to say that the blow-molding nozzle 4 rises, and the cavity 3 separates to free the finished container.

In other words, the production cycle comprises a stage S0-R2 for pre-blow molding and for final recovery and an intermediate stage S1-R1. It is understood that the recovery cycle can have several successive intermediate stages and that the blow-molding cycle can have several blow-molding steps.

The object of the invention is to optimize the curve Pr(t) to maximize the efficiency of the blow molding. It is possible, for example, to increase the proportion of the time when the pressure is maintained at 40 bar in the container.

It is understood that an important source of optimization is not to wait too long for the air pressure of the container to stabilize with the intermediate systems S1, R1, R2. However, an excessive anticipation of the changes of sub-phases would degrade the recovery of energy.

The invention proposes to analyze whether the changeover instants between sub-phases are optimal as a function of a predetermined criterion, then to modify the change target of sub-phases for subsequent production cycles.

As illustrated in FIGS. 3 and 4, a first optimization criterion can be a pressure difference between the container and the system to which this container is connected. For example, for an intermediate recovery stage (S1-R1) at about 20 bar, when the pressure in the container approaches 0.5 bar of the pressure of the system to which this container is connected, it is considered that the flow of air between the two is too slow and that it is preferable to trigger the changeover to the next sub-phase.

During a production cycle, a computer records as a function of time the pressure Pr(t) in the container and the pressure in the intermediate blow-molding system S1 and in the intermediate recovery systems R1, R2. At the end of the data acquisition cycle, the curves are analyzed.

A scanning zone Ze has been predetermined around points of control for opening and for closing of the valves, so that the point E for triggering of the second blow-molding sub-phase can be found there. By digital filtering and/or analysis of the derivatives of the curve Pr(t), a computer determines the instant $t_e$ when the triggering takes place. The computer derives the actual value of the pressure $Pr(t_e)$ in the container and the pressure $P1(t_e)$ in the first blow-molding system S1.

If, as illustrated in FIG. 3, $P1(t_e)-Pr(t_e)$ is less than the predetermined difference (0.5 bar), the computer scans the prior instants until it finds an instant $t'_e$ for which the criterion $P1(t'_e)-Pr(t'_e)$ is equal to 0.5 bar. This instant $t'_e$ is then a target instant for triggering the following sub-phase during a subsequent production cycle.

If, as illustrated in FIG. 4, $P1(t_e)-Pr(t_e)$ is greater than the predetermined difference, such as 0.5 bar, then the computer simulates the extension of the pressure curve in the container as if there had been no triggering of the next sub-phase. In this simulated curve portion, illustrated in a broken line in FIG. 4, the computer derives an instant $t'_e$ for which the criterion $P1(t'_e)-Pr(t'_e)$ is equal to the predetermined difference. The thus determined instant $t'_e$ is used as a target for triggering the next sub-phase during a subsequent production cycle.

Figure 5:
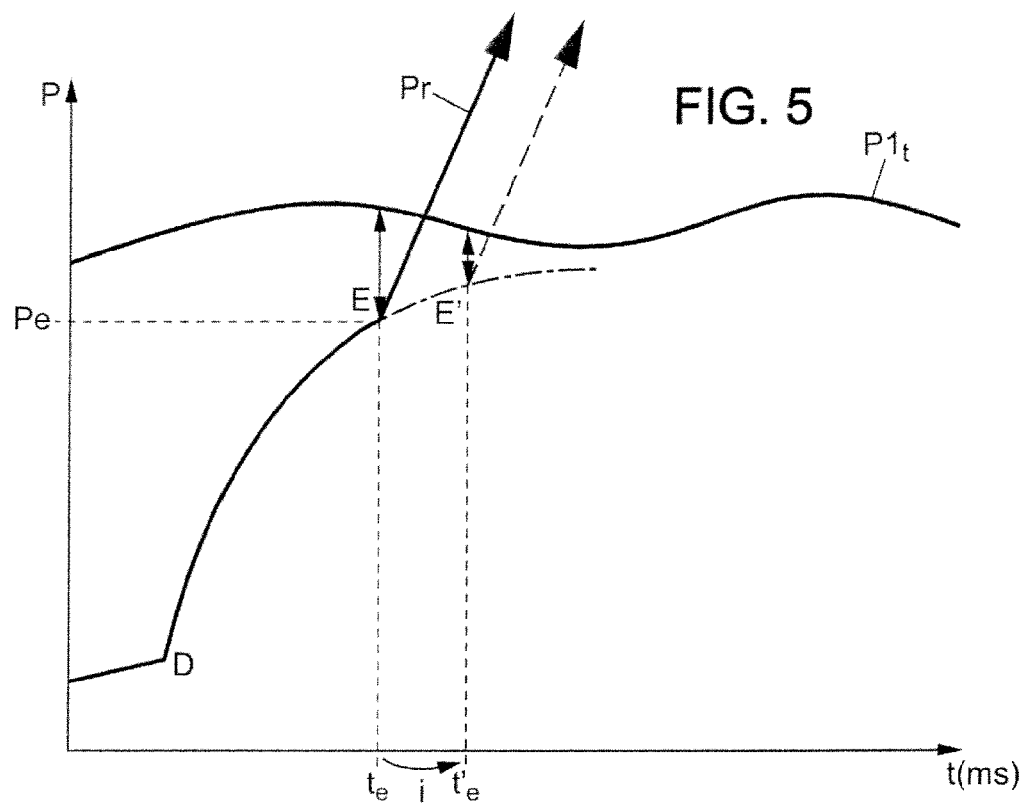
FIG. 5 illustrates a third embodiment of the method.

In a variant illustrated in FIG. 5, if at the actual instant $t_e$ of change of sub-phase, the criterion $P1(t_e)-Pr(t_e)$ is greater than the predetermined difference such as 0.5 bar, instead of computing a simulated curve, the target instant is simply incremented by a predetermined value "i." Thus, the determination of the target instant is very fast even if it only permits approaching the optimal value. At the end of the subsequent cycle in which the target is applied, it will be possible to analyze again the measurements of pressures taken to know whether one is in the configuration described with FIG. 3 or whether another increment is necessary as in FIG. 5.

It is understood that the criterion of the difference in pressures can be transposed to optimize the points G and H of FIG. 2.

After having determined the actual instant or instants $t_g$, $t_h$ of change of sub-phase, the computer measures the absolute value of the difference in pressures between the container and the system to which the container is connected before this change. If this difference is less than a predetermined value for this criterion, such as 0.5 bar, a target instant $t'_g$ or $t'_h$ is determined to trigger the change of sub-phase during a subsequent production cycle. The procedure as in FIG. 3 is followed by the scanning of the value of this criterion before the actual instant, or as in FIG. 4 by simulation of an extended curve, or as in FIG. 5 by addition of an increment.

Figure 6:
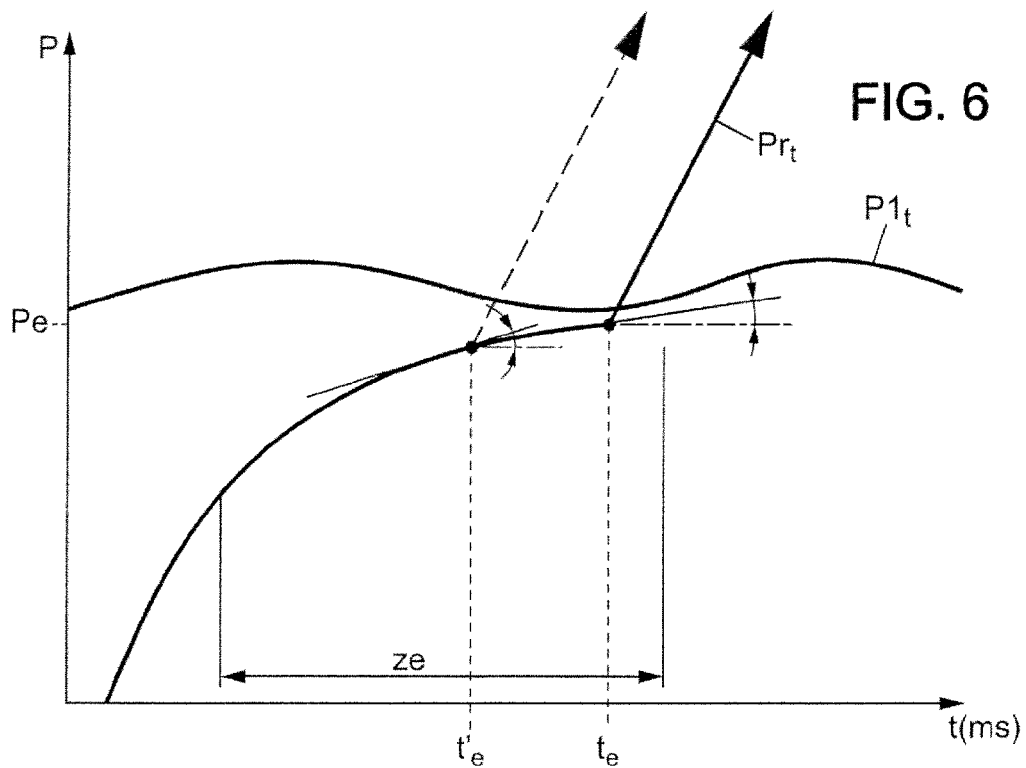
FIG. 6 illustrates a fourth embodiment of the method.

As illustrated in FIG. 6, another criterion for change of sub-phase can be used. If, at the actual instant $t_e$ of change of sub-phase, the slope $$|P'| = \left|\frac{dPr}{dt}(t_e)\right|$$

of the pressure $Pr(t)$ in the container is less than a predetermined value, it means that the passage to the next sub-phase has been too late. The computer then determines a prior instant $t'_e$ for which the criterion $$\left|\frac{dPr}{dt}(t'_e)\right|$$

is equal to the predetermined slope. This criterion offers the advantage of using the calculation of the derivative made to determine the actual instant $t_e$. In addition, this avoids measuring the pressure in the air system concerned. This avoids having to filter these measurements. The slope of the curve of pressure in the container is directly representative of the difference in mean pressure at the instant considered.

Figure 7:
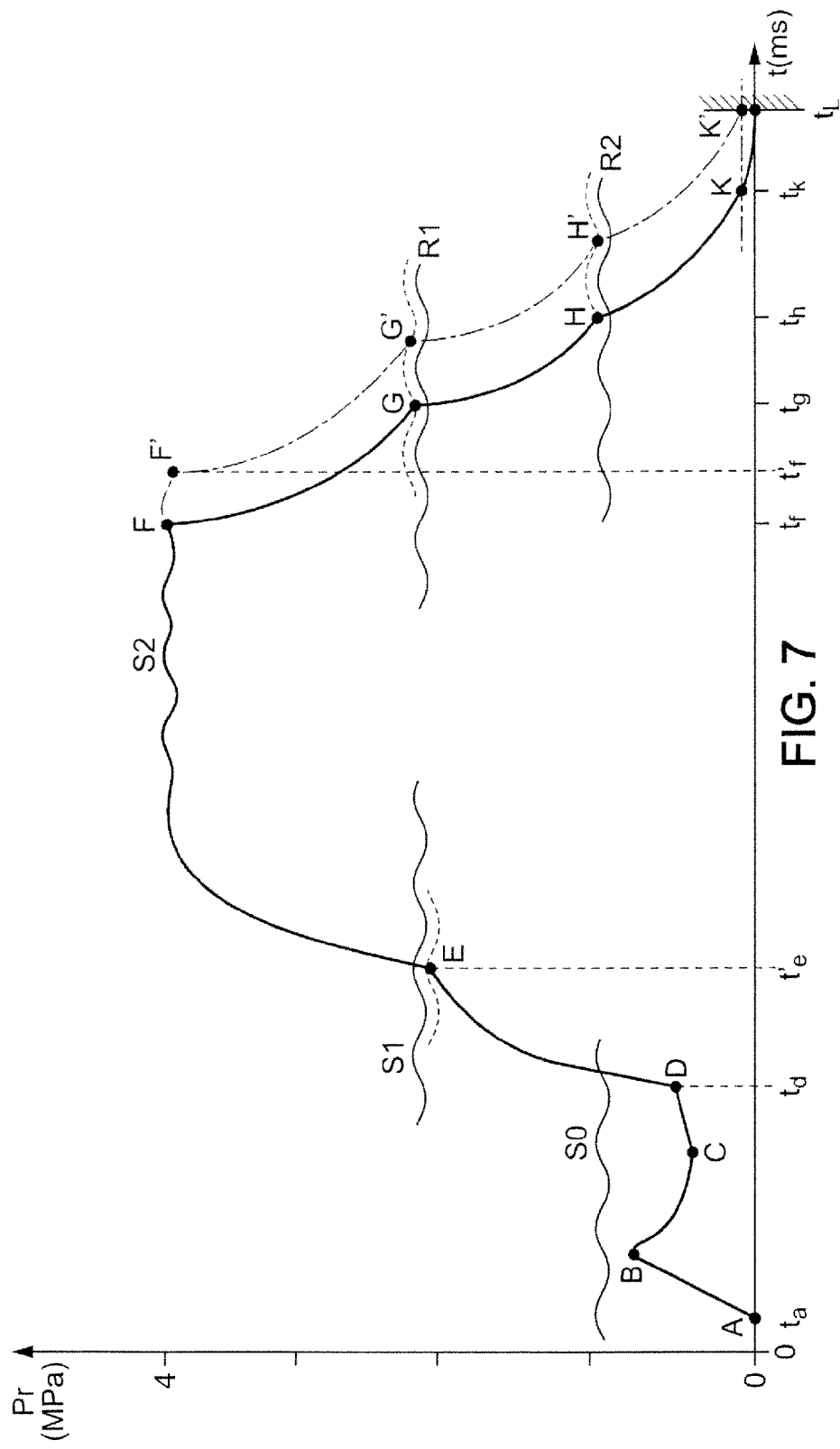
FIG. 7 illustrates a fifth embodiment of the method.

FIG. 7 illustrates a subsequent step of the method. It is considered that during a certain number of prior cycles of production, the points E, G, H of change of sub-phase of blow molding and of recovery have already been optimized and that it has been found that the process is relatively stable from one cycle to the next. The object of this step of the process is either to optimize the period of time of the increment at maximum pressure or to optimize the rate of speed of the stretch-blow-molding machine. A combination of these two optimizations is also possible.

The possible optimization comes from the fact that a final degassing pressure threshold that is low, for example on the order of 0.5 bar, exists for which the mold can be opened and the blow-molding nozzle 4 can be withdrawn without a risk of degrading the sealing mechanism of the blow-molding nozzle 4 and without causing excessive noise. Therefore, if, as illustrated in FIG. 7, the pressure in the container reaches this final degassing threshold before the mold is opened, it means that time is lost. This unused time can be carried forward into the maximum pressure increment and/or makes it possible to speed up the production rate of speed.

The computer determines the actual mean pressure in the container over a period of time preceding the opening of the mold. This period of time is predetermined so as to be short relative to the period of time of the degassing and longer than the transitory phase of pressure drop in a container which would still contain a pressure of one or several bar during the opening of the mold. If this actual mean pressure is less than the final degassing pressure threshold, the computer scans the curve $Pr(t)$ and determines an instant $t_k$ for which $Pr(t_k)$ is equal to said threshold. This instant $t_k$ is known as the target instant of the end of degassing.

If the actual mean pressure in the predetermined period of time before the opening of the mold is greater than the final degassing pressure threshold, the computer computes the first derivative and optionally the second of the curve $Pr(t)$ in said period of time and computes a simulated pressure curve in the container after the opening of the mold as if the opening had not taken place. The computer then determines a target instant $t_k$ of the end of degassing for which the simulated pressure would be equal to the final degassing pressure threshold. This target instant of degassing is then subsequent to the actual opening of the mold.

To optimize the increment at maximum pressure, the computer determines the end of the blow-molding instant $t_f$, i.e., the instant of the actual beginning of the first recovery. It also determines the instant $t_L$ of opening of the mold.

If the end of the degassing target instant $t_k$ which has been determined is prior to the instant $t_L$ of the actual opening of the mold, then the end of the blow-molding instant $t'_f$ is subsequent to the actual end of the blow-molding instant $t_f$ by a period of time equal to the period of time passing from the target instant $t_k$ of the end of degassing until the instant $t_L$ of the actual opening of the mold. In the subsequent cycle where this end of the blow-molding target is applied, the characteristic points F, G, H and K will be translated from this period of time and will become F', G', H' and K' illustrated in broken lines. Thus, the instant K' and the opening of the mold will be simultaneous.

If the end of the degassing target instant $t_k$ is subsequent to the instant $t_L$ of the actual opening of the mold, then the target instant $t'_f$ of the end of blow molding is prior to the actual instant $t_f$ of the end of blow molding, for a period of time equal to the period of time that passes from the opening of the mold to the simulated target instant $t_k$ of the end of degassing.

In a variant, the target instant $t'_f$ of the end of blow molding can be obtained by going back a predetermined period of time to the actual instant $t_f$ of the end of blow molding.

Finally, to optimize the production rate of speed, the computer determines the instant $t_a$ of the beginning of pre-blow molding and the actual instant $t_L$ of opening of the mold. The target rate of speed for a subsequent production cycle is equal to the rate of speed during the current cycle multiplied by the period of time between the instant $t_a$ of the beginning of pre-blow molding and the instant $t_L$ of opening of the mold, divided by the period of time between the instant $t_a$ of the beginning of pre-blow molding and the target instant $t_k$ of the end of degassing.

The invention claimed is:

1. A method for producing thermoplastic containers by stretch-blow molding including a series of production cycles during each of which a new container is produced, each production cycle comprising a pre-blow-molding phase where a preform is connected through a nozzle to a pre-blow-molding air system so that the preform becomes a container ready to be blow molded during an overall blow-molding phase, the method comprising successively at least the following sub-phases:
   conducting blow molding or a series of blow moldings by connecting the container successively to increasingly higher-pressure air systems;
   then performing a recovery or a series of recoveries by connecting the container successively to increasingly lower-pressure recovery air systems, until a final recovery where the container is connected to a final air system;
   then performing a degassing by connecting the container to atmospheric pressure; and
   finally opening the mold by disconnecting the nozzle,
   wherein at least one characteristic point of the pressure in the container is selected that is taken from selectable points that are:
      when there are several blow moldings, the transition between two successive blow moldings, and
      when there are several recoveries, the transition between two successive recoveries, and
      the transition between the final recovery and the degassing,
   wherein, for each selected characteristic point,
      a scanning time zone is determined where the selected characteristic point is found,
      a triggering criterion is determined, the triggering criterion representing a progress status of an air pressure stabilization between two receptacles during at least the scanning time zone, the two receptacles being defined by the container and one of the air systems to which the container is connected before the selected characteristic point, and
      a predetermined value of the criterion is determined,
   wherein, during a data acquisition phase that extends over at least one production cycle, the pressure is measured in the container to register a pressure curve along at least the scanning time zone of each selected characteristic point,
   wherein, for each selected characteristic point, the following are determined from the pressure curve measured:
      an actual instant corresponding to said selected characteristic point,
      an actual value of the criterion at the selected characteristic point, and
      a target instant to trigger, in a subsequent production cycle, the passage to the sub-phase that is subsequent to the selected characteristic point, such that:
         when the actual value of the criterion is less than or equal to the predetermined value, the target instant is the instant for which the criterion has assumed a value equal to the predetermined value, and
         when the actual value of the criterion is strictly greater than the predetermined value, the target instant is subsequent to the actual instant and is determined to ensure that at the target instant, the criterion assumes a value approaching or coinciding with the predetermined value.

2. The method according to claim 1, wherein, for at least one selected characteristic point, the triggering criterion is the absolute value of the pressure difference between the container and the air system to which the container is connected during the sub-phase immediately before the characteristic point,
   the method further comprises measuring, during the production and data acquisition cycle, the pressure in the air system to which the container is connected before the selected characteristic point.

3. The method according to claim 1, wherein for at least one selected characteristic point, the triggering criterion is the absolute value of the slope of the first derivative of the pressure measurement in the container.

4. The method according to claim 1, wherein a time increment is determined that is adapted to one of the at least one selected characteristic point and to the triggering criterion and wherein, when the actual value of the triggering criterion at said selected characteristic point is greater than the predetermined value, the target instant for the subsequent production cycle is equal to the actual instant for the cycle that has just been measured, increased by the increment.

5. The method according to claim 1, wherein when the actual value of the triggering criterion at one of the at least one selected characteristic point is greater than the predetermined value, the triggering criterion is simulated subsequent to the actual instant, and
   wherein the target instant for the subsequent cycle is equal to the instant for which the simulated criterion assumes a value equal to the predetermined value.

6. The method according to claim 1, wherein a predetermined final degassing pressure threshold is determined, and, from the curves of pressures measured,
   an actual instant of the end of blow molding and the pressure in the container just before the opening of the mold are determined, and
   a target instant of the end of blow molding for the subsequent production cycle is determined, the target instant of the end of blow molding being prior to, equal to, or subsequent to the actual instant of the end of blow molding depending on whether the pressure in the container just before the opening of the mold is respectively greater than, equal to, or less than the final degassing pressure threshold.

7. The method according to claim 6, wherein when the mean pressure in the container over a predetermined period of time before the opening of the mold is less than the final degassing pressure threshold, a target instant of the end of degassing is determined for which the pressure measured in the container is equal to a predetermined threshold, and wherein the target instant of the end of blow molding for the subsequent production cycle is subsequent to the actual instant of the end of blow molding for a period of time equal to the period of time that passes from the target instant of degassing to an instant of the actual opening of the mold.

8. The method according to claim 6, wherein when the mean pressure in the container over a predetermined period of time before the opening of the mold is greater than the final degassing pressure threshold, the target instant of the end of blow molding for the subsequent cycle is determined,
by going back a predetermined period of time to the actual instant of the end of blow molding, or
by simulating the pressure in the container as if there had not been any opening of the mold, by determining a target instant of degassing for which the simulated pressure is equal to the final degassing pressure threshold, the target instant of the end of blow molding then being prior to the actual instant of the end of blow molding for a period of time equal to the period of time that passes from an instant of an actual opening of the mold to the target instant of degassing.

9. The method according to claim 6, further comprising:
during primary production cycles:
monitoring the mean pressure in the recovery system and determining a transition primary production cycle defined by the mean pressure in the recovery system reaching a predetermined threshold,
using a single blow molding from the highest-pressure air system from a first primary production cycle to the transition primary production cycle, and
determining an initial position of the beginning of the first recovery at least during the first primary production cycle;
during secondary production cycles subsequent to the primary production cycles:
using a plurality of blowing sub-phases and a plurality of recoveries for each secondary production cycle, and
selecting the characteristic point of the beginning of a last blow molding and of an end of the first recovery, the two selected characteristic points being optimized in the secondary production cycles;
during at least one tertiary production cycle:
selecting the characteristic point of the final recovery of a first of the at least one tertiary production cycle, and
optimizing the characteristic point of the final recovery during the at least one tertiary production cycle; and then, determining the actual instant of the end of the last blow molding.

10. The method according to claim 1, further comprising:
using a carousel equipped with a plurality of stretch-blow-molding stations, each connected to the different air systems, a portion or all of said stations being reference stations;
for each container of the reference stations and for each point selected, measuring the pressure in the container of each of the reference stations, and determining a corresponding target instant;
for each selected point, analyzing the distribution of said corresponding target instants and determining an alert message, a stability message, or a mean target instant for the point selected, and
wherein, when the mean target instant is determined, said mean target instant is applied in all of the stretch-blow-molding stations, starting from one of the subsequent production cycles.

11. The method according to claim 1, further comprising:
to go from a sub-phase of the overall blow-molding phase that precedes one of the selected characteristic points of pressure to a sub-phase following said characteristic point:
controlling the closing of a connecting valve corresponding to the sub-phase that precedes said characteristic point, and
controlling the opening of the connecting valve corresponding to the sub-phase that follows the characteristic point.

12. The method according to claim 10, wherein time targets for actuating connecting valves of the container are determined by taking into account a response time of said valves to ensure that an actual closing of the valve to be closed is prior to or coincides with an instant of the actual opening of a valve to be opened.

13. The method according to claim 1, wherein to determine one of the selected characteristic points of the pressure in the container as a function of time:
a digital filter is applied to the curve of pressure in the container,
a scanning time zone of the curve is determined where the characteristic point to be determined can be found, and
an angular point of the curve in the scanning zone is detected.

14. The method according to claim 2, wherein for at least one selected characteristic point, the triggering criterion is the absolute value of the slope of the first derivative of the pressure measurement in the container.

15. The method according to claim 7, wherein when the mean pressure in the container over a predetermined period of time before the opening of the mold is greater than the degassing pressure threshold, the target instant of the end of blow molding for the subsequent cycle is determined,
by going back a predetermined period of time to the actual instant of the end of blow molding, or
by simulating the pressure in the container as if there had not been any opening of the mold, by determining a target instant of degassing for which the simulated pressure is equal to the final degassing pressure threshold, the target instant of the end of blow molding then being prior to the actual instant of the end of blow molding for a period of time equal to the period of time that passes from the instant of the actual opening of the mold to the target instant of degassing.

* * * * *